(12) United States Patent
Gordon

(10) Patent No.: US 10,313,713 B2
(45) Date of Patent: Jun. 4, 2019

(54) METHODS, SYSTEMS, AND MEDIA FOR IDENTIFYING AND PRESENTING USERS WITH MULTI-LINGUAL MEDIA CONTENT ITEMS

(71) Applicant: Google LLC, Mountain View, CA (US)

(72) Inventor: Marcel Phillip Gordon, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/842,266

(22) Filed: Dec. 14, 2017

(65) Prior Publication Data

US 2018/0109821 A1  Apr. 19, 2018

Related U.S. Application Data

(63) Continuation of application No. 15/188,483, filed on Jun. 21, 2016, now Pat. No. 9,848,215.

(51) Int. Cl.
*H04N 21/278* (2011.01)
*H04N 21/234* (2011.01)
(Continued)

(52) U.S. Cl.
CPC ..... *H04N 21/23418* (2013.01); *H04N 21/233* (2013.01); *H04N 21/2668* (2013.01); *H04N 21/278* (2013.01); *H04N 21/4394* (2013.01); *H04N 21/44008* (2013.01); *H04N 21/44218* (2013.01); *H04N 21/8106* (2013.01); *H04N 21/84* (2013.01)

(58) Field of Classification Search
None
See application file for complete search history.

(56) References Cited

U.S. PATENT DOCUMENTS 9,848,215 B1 * 12/2017 Gordon ............... H04N 21/233
2012/0274850 A1    11/2012 Hawkins et al.
(Continued)

OTHER PUBLICATIONS

Notice of Allowance dated Jul. 28, 2017 in U.S. Appl. No. 15/188,483.
Office Action dated May 19, 2017 in U.S. Appl. No. 15/188,483.

*Primary Examiner* — Pankaj Kumar
*Assistant Examiner* — Charles N Hicks
(74) *Attorney, Agent, or Firm* — Byrne Poh LLP

(57) ABSTRACT

Methods, systems, and media for identifying and presenting users with multi-lingual media content items are provided. In some embodiments, the method comprises: receiving a video content item; identifying a first language associated with the video content item; identifying content within the video content item; determining a likelihood that the video content item is a multi-lingual content item that is not language specific based on the identified content within the video content item; receiving a request for media content; determining a second language associated with the request for media content, wherein the second language is different from the first language; in response to determining that the second language that is different from the first language, determining whether to present the video content item based on the determined likelihood; and responsive to the request for media content, causing the video content item to be presented in response to determining that the video content item is deemed to be multi-lingual content that is not language specific.

16 Claims, 5 Drawing Sheets

(51) Int. Cl.
    *H04N 21/233*    (2011.01)
    *H04N 21/2668*   (2011.01)
    *H04N 21/439*    (2011.01)
    *H04N 21/44*     (2011.01)
    *H04N 21/442*    (2011.01)
    *H04N 21/81*     (2011.01)
    *H04N 21/84*     (2011.01)

(56) References Cited

U.S. PATENT DOCUMENTS

2013/0018788 A1   1/2013   Johnson et al.
2016/0171109 A1   6/2016   Gnanasekaran \* cited by examiner

METHODS, SYSTEMS, AND MEDIA FOR IDENTIFYING AND PRESENTING USERS WITH MULTI-LINGUAL MEDIA CONTENT ITEMS

CROSS-REFERENCE TO RELATED APPLICATIONS

This application is a continuation of U.S. patent application Ser. No. 15/188,483, filed Jun. 21, 2016, which is hereby incorporated by reference herein in its entirety.

TECHNICAL FIELD

The disclosed subject matter relates to methods, systems, and media for identifying and presenting users with multi-lingual media content items.

BACKGROUND

Many users access video content from services having large collections of video content items. Frequently, these collections include video content that has been uploaded by users from various countries and that contains audio content and/or text content in a variety of languages. As such, video content may be served to users that are unlikely to comprehend the content. For some video content, it may be important for these services to present users with video content that contain audio and/or text content in a language that the user can comprehend.

In some cases, these collections include video content that either does not contain verbal and/or text content or may be considered to be enjoyable for users that cannot understand the specific language of the verbal and/or text content. These services, however, generally do not readily provide a user with access to such video content that are in a language different from the language of the user. For example, a video provision service may rank search results that includes video content items based on the specific language preference identified by the user, based on a country domain extension, and/or based a country-specific website. In another example, a video provision service may remove, from a list of search results, video content that includes content in a language that is different from the language preference identified by the user.

Accordingly, it is desirable to provide new methods, systems, and media for identifying and presenting users with multi-lingual media content items.

SUMMARY

Methods, systems, and media for identifying and presenting users with multi-lingual media content items are provided.

In accordance with some embodiments of the disclosed subject matter, a method for presenting media content to users is provided, the method comprising: receiving a video content item; identifying, using a hardware processor, a first language associated with the video content item; identifying content within the video content item; determining a likelihood that the video content item is a multi-lingual content item that is not language specific based on the identified content within the video content item; receiving a request for media content; determining a second language associated with the request for media content, wherein the second language is different from the first language; in response to determining that the second language that is different from the first language, determining whether to present the video content item based on the determined likelihood; and responsive to the request for media content, causing the video content item to be presented in response to determining that the video content item is deemed to be multi-lingual content that is not language specific.

In some embodiments, identifying content in the video content segment further comprises: identifying words contained in audio content associated with the video content item; and identifying words contained in image content associated with the video content item.

In some embodiments, the method further comprises, in response to the request for media content, causing a plurality of video content items to be presented that includes the video content item and concurrently presenting a language indicator, wherein the language indicator associated with the video content item indicates that the video content item is multi-lingual content.

In some embodiments, identifying the content within the video content item further comprises retrieving metadata associated with the video content item, wherein the metadata includes subtitle metadata.

In some embodiments, the method determining the first language associated with the video content item further comprises retrieving metadata associated with the video content item, wherein the metadata includes a language identifier associated with the video content item.

In some embodiments, determining the first language associated with the video content item further comprises determining a location associated with a user device that uploaded the video content item.

In some embodiments, determining the likelihood that the video content item is multi-lingual content based on a number of words in the identified content within the video content item.

In some embodiments, determining the likelihood that the video content item is multi-lingual content based on a density of words in the identified content within the video content item.

In some embodiments, determining the likelihood that the video content item is multi-lingual content further comprises comparing the determined likelihood with a multi-lingual threshold score.

In some embodiments, determining the likelihood that the video content item is multi-lingual content further comprises determining multi-lingual content identifiers associated with content relating to the video content item.

In some embodiments, the method further comprises: receiving user reaction metadata to the video content item that was deemed to be multi-lingual content; and updating the determined likelihood based on the received user reaction metadata.

In some embodiments, the user reaction metadata includes an amount of time that the video content item was presented before being stopped.

In some embodiments, the method further comprises: selecting a portion of the user reaction metadata based on a language identifier associated with the user devices that provided the user reaction metadata; and updating the determined likelihood based on the selected portion of the user reaction metadata.

In some embodiments, the method further comprises causing, while the video content item is being presented, a recommendation prompt that queries whether the video content item is multi-lingual content.

In accordance with some embodiments of the disclosed subject matter, a system for presenting media content to users is provided, the system comprising a hardware processor that is configured to: receive a video content item; identify a first language associated with the video content item; identify content within the video content item; determine a likelihood that the video content item is a multi-lingual content item that is not language specific based on the identified content within the video content item; receive a request for media content; determine a second language associated with the request for media content, wherein the second language is different from the first language; in response to determining that the second language that is different from the first language, determine whether to present the video content item based on the determined likelihood; and responsive to the request for media content, cause the video content item to be presented in response to determining that the video content item is deemed to be multi-lingual content that is not language specific.

In accordance with some embodiments of the disclosed subject matter, a non-transitory computer-readable medium containing computer executable instructions that, when executed by a processor, cause the processor to perform a method for presenting media content to users is provided, the method comprising: receiving a video content item; identifying a first language associated with the video content item; identifying content within the video content item; determining a likelihood that the video content item is a multi-lingual content item that is not language specific based on the identified content within the video content item; receiving a request for media content; determining a second language associated with the request for media content, wherein the second language is different from the first language; in response to determining that the second language that is different from the first language, determining whether to present the video content item based on the determined likelihood; and responsive to the request for media content, causing the video content item to be presented in response to determining that the video content item is deemed to be multi-lingual content that is not language specific.

In accordance with some embodiments of the disclosed subject matter, a system for presenting media content to users is provided, the system comprising: means for receiving a video content item; means for identifying a first language associated with the video content item; means for identifying content within the video content item; means for determining a likelihood that the video content item is a multi-lingual content item that is not language specific based on the identified content within the video content item; means for receiving a request for media content; means for determining a second language associated with the request for media content, wherein the second language is different from the first language; in response to determining that the second language that is different from the first language, means for determining whether to present the video content item based on the determined likelihood; and responsive to the request for media content, means for causing the video content item to be presented in response to determining that the video content item is deemed to be multi-lingual content that is not language specific.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
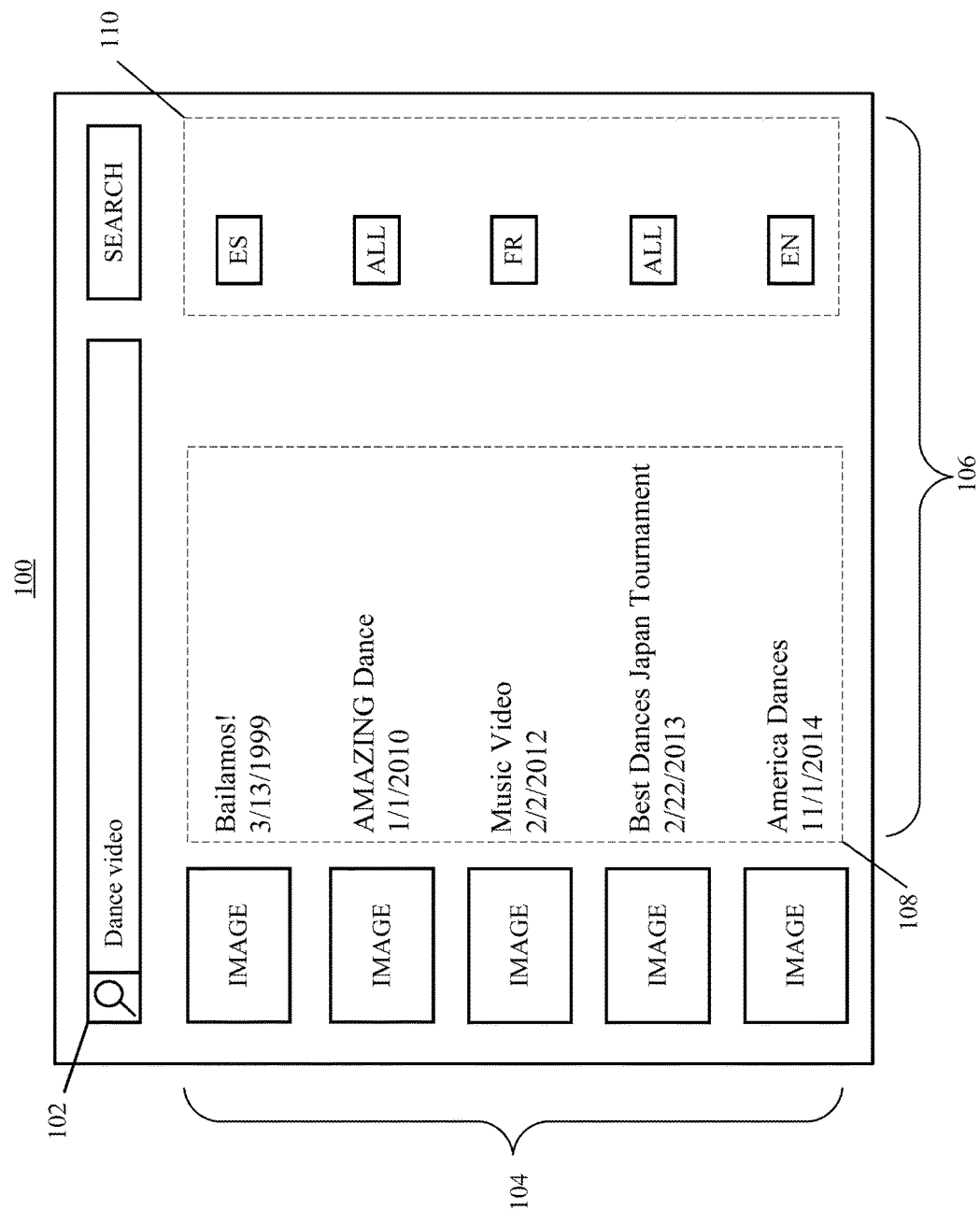
FIG. 1 shows an example of a user interface for presenting video content items as search results to users associated with any of many different languages (including content items deemed to be multi-lingual content items) in accordance with some embodiments of the disclosed subject matter.

In accordance with various embodiments of the disclosed subject matter, mechanisms (which can include methods, systems, and media) for identifying and presenting users with multi-lingual media content items are provided.

In some embodiments of the disclosed subject matter, the mechanisms described herein can determine whether a video content item is likely to be enjoyable for users that speak or comprehend languages that are different from a language associated with the video content item (e.g., that the video content item likely is not language specific or can be deemed to be a multi-lingual content item) by determining whether, and to what extent, the video content item contains words. For example, a video content item that has a title written in English from title metadata and is uploaded by a user that has indicated a language preference of English from user profile data may nevertheless contain no speech content and no textual content within the video content item. In another example, a video content item can be uploaded, where a language identifier of English has been associated with the video content item, but may nevertheless contain less than a threshold amount of speech content and less than a threshold amount of textual content within the video content item. In such examples, these mechanisms can determine that the video content item contains no words and consequently that the video content item is likely to be enjoyable for users that do not speak English. In some embodiments, the mechanisms can indicate that the video content item is a multi-lingual content item (e.g., a multi-lingual identifier). The mechanisms can then, for example, present the multi-lingual video content item in search results and/or recommendations for users that are not do not speak or comprehend English (e.g., users with user profiles that include non-English language preferences, users that have accessed non-English-versions of a video provision website, etc.).

In some embodiments, upon determining that a video content item is likely not language specific (e.g., language-independent, language-agnostic, and/or otherwise multi-lingual content) and presenting the video content item to users that speak any of many different languages, the mechanisms described herein can determine the reaction of those users to the video content item and update the likelihood that the video content item is not language specific according to their reaction. For example, if a user searches for a video content item utilizing Spanish search terms, the mechanisms can present the user with a video content item that is associated with English (e.g., the video content item was uploaded by a user account with English language preferences) and/or associated with a multi-lingual identifier. In such an example, if the user selects the video content item and causes it to be played, but it is determined that the user stops the video content item after only a short time (e.g., several seconds), the mechanisms can determine that the video content item was played for only a short time and update the likelihood that the video content item is not language specific accordingly (e.g., by reducing the likelihood that the video content item is language-independent, language-agnostic, and/or otherwise multi-lingual content). In such an example, the mechanisms can then present the video content item less frequently in search results associated with a search containing non-English search terms.

Turning to FIG. 1, an example 100 of a user interface for presenting media content items as search results to users associated with any of many different languages is illustrated in accordance with some embodiments of the disclosed subject matter. As shown, in some embodiments, user interface 100 can include a search element 102, one or more selectable video content elements 104, and video content metadata 106, which can include video content information text 108, and language icons 110.

Search element 102 can be any suitable search element for user interface 100. In some embodiments, search element 102 can include any suitable icons, links, and/or any other suitable user interface element. Note that the position of search element 102 in user interface 100 is merely an example, and search element 102 can be located at any suitable position. In some embodiments, search element 102 can be omitted.

Selectable video content elements 104 can be any selectable elements suitable for representing video content item in user interface 100. In some embodiments, selectable video content elements 104 can be any selectable elements suitable for causing an associated video content item to be played. For example, selectable video content elements 104 can be hyperlinks, selectable icons, selectable photos, any other suitable selectable elements, or any suitable combination thereof. In some embodiments, selectable video content elements 104 can include any suitable number of selectable video content elements (e.g., one, two, five, ten, and/or any other suitable number). In some embodiments, selectable video content elements 104 can be presented in user interface 100 in any suitable position, combination, pattern, or arrangement. In some embodiments, selectable video content elements 104 can be omitted.

Video content metadata 106 and video content information 108 can include any suitable information. For example, in some embodiments, video content metadata 106 and video content information 108 can include a title, a date associated with the video content item, a length of the video content item, any other suitable information, or any suitable confirmation thereof. In some embodiments, video content metadata 106 and/or video content information 108 can be omitted.

Language icons 110 can be any suitable representation of a language associated with one or more of video content items 104. For example, language icons 110 can include information identifying a language associated with the corresponding video content item, as shown in FIG. 1. In such an example, the language icon can contain the letters "ES" which can represent that the associated video content item contains content in Spanish, the letters "FR" which can represent that the associated video content item contains content in French, and/or the letters "EN" which can represent that the associated video content item contains content in English. In some embodiments, a video content item that is associated with multiple languages can be represented by a primary language or the language that is determined to be mostly used in the content contained within the video content item. In some embodiments, languages associated with the one or more video content items 104 can be represented in metadata but not displayed in user interface 100.

In some embodiments, as described herein, in response to determining that a video content item is a multi-lingual content item, language icons 110 can include information identifying that a multi-lingual content identifier has been associated with the corresponding video content item, such as the letters "ALL" shown in FIG. 1. It should be noted that any suitable language icon can be shown to identify that a content item is language-agnostic, language-independent, or otherwise deemed to be multi-lingual content.

Figure 2:
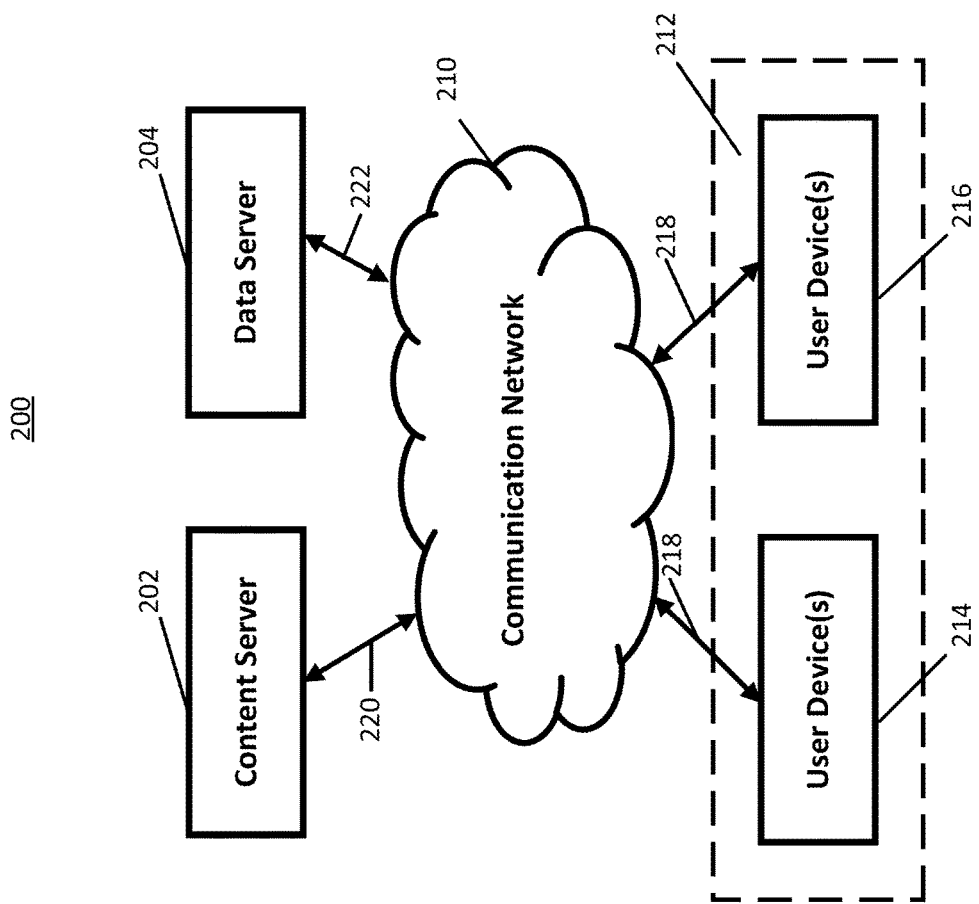
FIG. 2 shows a schematic diagram of an illustrative system suitable for implementation of the mechanisms described herein for identifying and presenting users with multi-lingual media content items in accordance with some embodiments of the disclosed subject matter.

Turning to FIG. 2, an example 200 of hardware that can be used in accordance with some embodiments of the disclosed subject matter for identifying and presenting users with multi-lingual media content items is shown. As illustrated, hardware 200 can include one or more servers, such as a content server 202 and a data server 204, as well as a communication network 210, and/or one or more user devices 212, such as user devices 214 and 216.

In some embodiments, content server 202 can be any suitable server for storing media content and delivering the content to a user device 212. For example, content server 202 can be a server that streams media content to a user device 212 via communication network 210. Media content provided by content server 202 can be any suitable content, such as video content, audio content, electronic books, documents, images, and/or any other suitable type of media content. As a more particular example, media content can include television programs, movies, cartoons, sound effects, streaming live content (e.g., a streaming radio show, a live concert, and/or any other suitable type of streaming live content), and/or any other suitable type of media content. Media content can be created and uploaded to content server 202 by any suitable entity. In some embodiments, content server 202 can be omitted.

In some embodiments, data server 204 can be any suitable server for storing and/or transmitting information related to one or more video content items. As a more particular example, in some embodiments, data server 204 can store and/or transmit video content metadata. As another more particular example, in some embodiments, data server 204 can store and/or transmit information related to a likelihood that one or more video content item are not language specific. In this example, each content item can be associated with a multi-lingual content identifier in which a "1" is designated when the likelihood is greater than a particular threshold value and a "0" is otherwise designated. As yet another more particular example, in some embodiments, data server 204 can store and/or transmit information related to how users associated with certain languages (e.g., language preference identifiers) react to video content items associated with the same languages as the language preference identifier associated with that user and/or with different languages. In some embodiments, data server 204 can be omitted.

Communication network 210 can be any suitable combination of one or more wired and/or wireless networks in some embodiments. For example, communication network 210 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 212 can be connected by one or more communications links 218 to communication network 210 which can be linked via one or more communications links (e.g., communications links 220 and/or 222) to content server 202 and data server 204. Communications links 218, 220, and/or 222 can be any communications links suitable for communicating data among user devices 212 and servers 202 and/or 204 such as network links, dial-up links, wireless links, hard-wired links, any other suitable communications links, or any suitable combination of such links.

User devices 212 can include any one or more user devices suitable for requesting media content, searching for media content, playing media content, receiving input for playing media content, providing media content preferences (e.g., language preferences, spoken language preferences, written language preferences, etc.), and/or any other suitable functions. For example, in some embodiments, a user device 212 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, a user device 212 can be implemented as a non-mobile device such as a desktop computer, a set-top box, a television, a streaming media player, a game console, and/or any other suitable non-mobile device.

Although content server 202 and data server 204 are illustrated as separate devices, the functions performed by content server 202 and data server 204 can be performed using any suitable number of devices in some embodiments. For example, in some embodiments, the functions performed by either content server 202 or data server 204 can be performed on a single server. As another example, in some embodiments, multiple devices can be used to implement the functions performed by content server 202 and/or data server 204.

Although two user devices 214 and 216 are shown in FIG. 2 to avoid over-complicating the figure, any suitable number of user devices and/or any suitable types of user devices can be used in some embodiments.

Figure 3:
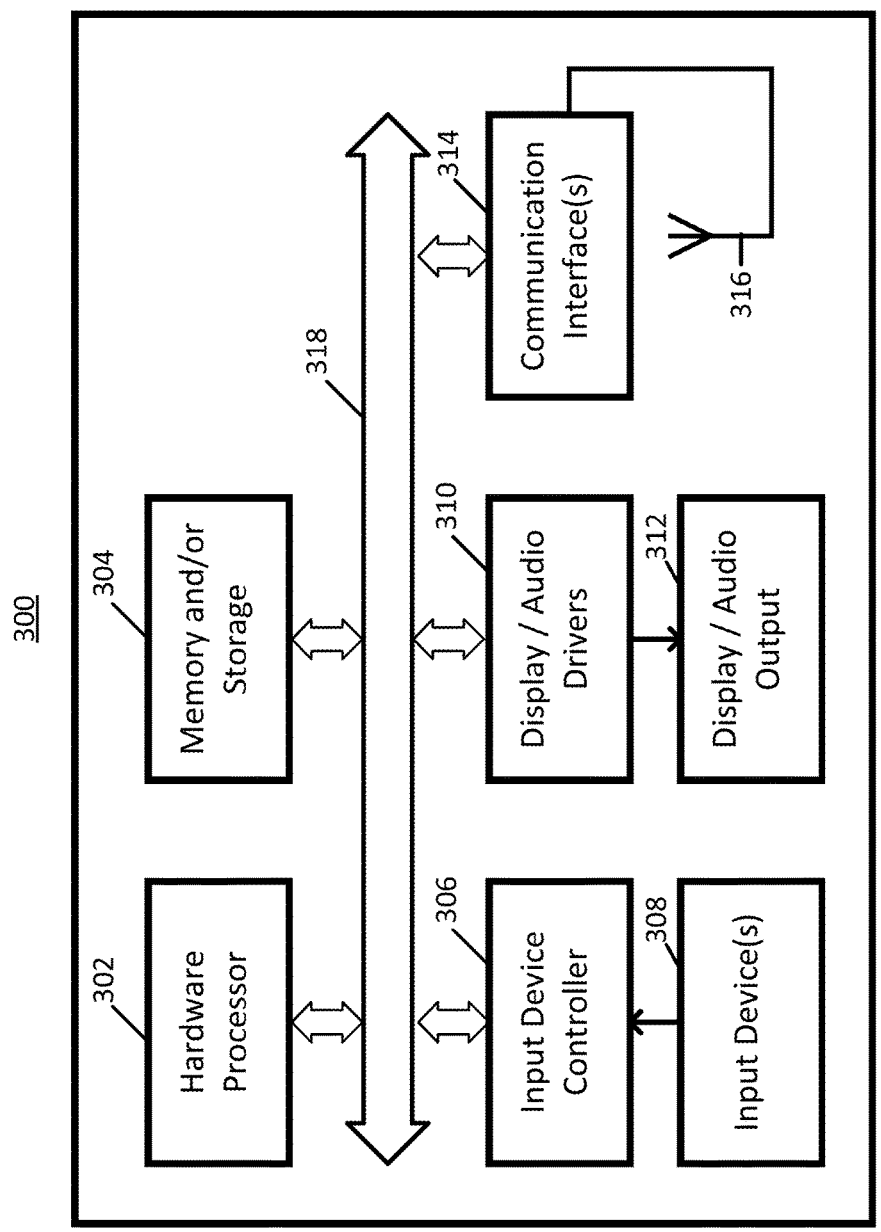
FIG. 3 shows a detailed example of hardware that can be used in a server and/or a user device of FIG. 2 in accordance with some embodiments of the disclosed subject matter.

Content server 202, data server 204, and user devices 212 can be implemented using any suitable hardware in some embodiments. For example, in some embodiments, devices 202, 204, and 212 can be implemented using any suitable general purpose computer or special purpose computer. As another example, a mobile phone may be implemented using a special purpose computer. Any such general purpose computer or special purpose computer can include any suitable hardware. For example, turning to FIG. 3, as illustrated in example hardware 300, such hardware can include hardware processor 302, memory and/or storage 304, an input device controller 306, an input device 308, display/audio drivers 310, display/audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as one of servers 202 or 204). For example, the server program can cause hardware processor 302 to perform the mechanisms described herein for presenting media content items to users associated with any of many different languages and/or perform any other suitable actions. In some embodiments, hardware processor 302 can be controlled by a computer program stored in memory and/or storage 304 of a user device 212. For example, the computer program can cause hardware processor 302 to present a media content item, request a media content item, and/or perform the mechanisms described herein for identifying and presenting users with multi-lingual media content items.

Memory and/or storage 304 can be any suitable memory and/or storage for storing application information, programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or from any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 210 as shown in FIG. 2. For example, interface(s) 314 can include network interface card circuitry, wireless communication circuitry, and/or any other suitable type of communication network circuitry.

Antenna 316 can be any of one or more suitable antennas for wirelessly communicating with a communication network (e.g., communication network 210) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
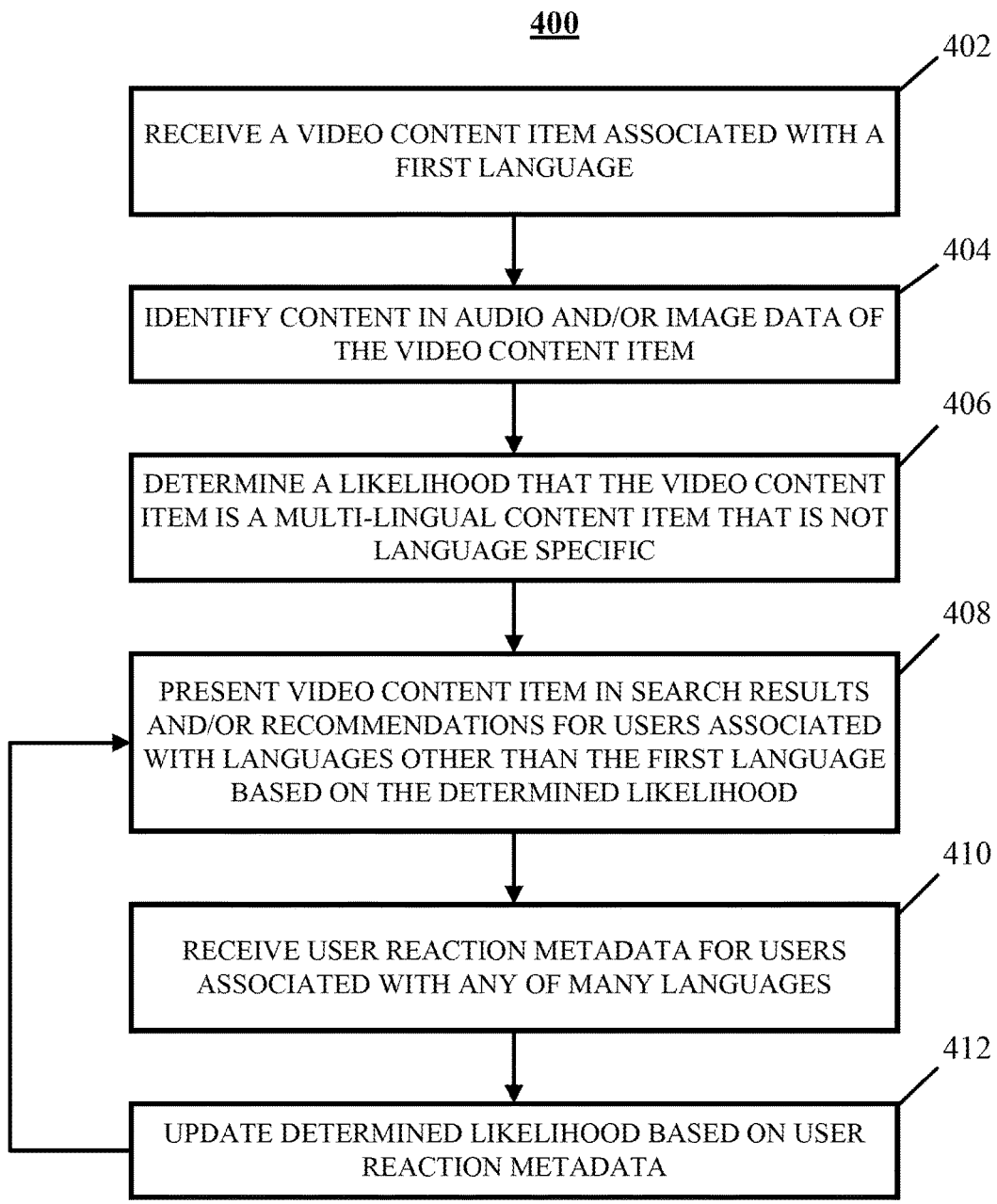
FIG. 4 shows an example of a process for determining a likelihood that a video content item is a multi-lingual content item in accordance with some embodiments of the disclosed subject matter.

Turning to FIG. 4, an illustrative example 400 of a process for identifying and presenting users with multi-lingual media content items is shown in accordance with some embodiments of the disclosed subject matter.

In some embodiments, process 400 can be executed by any device or combination of devices. For example, process 400 can be executed at least in part by content server 202, data server 204, one or more user devices 212, and/or any other suitable device.

Process 400 can begin at 402 by receiving a video content item associated with a first language. In some embodiments, process 400 can receive the video content item using any suitable technique or combination of techniques. For example, process 400 can receive the video content item from user device 212 at content server 202, and/or data server 204, utilizing communication network 210. In such an example, user device 212 can utilize an application for accessing a service associated with process 400, a web browser, and/or any other suitable software application. In another example, process 400 can receive multiple content items for uploading to a user-generated playlist, a channel of content items, or any other suitable location, where the content items can be accessed and played back by users of a media service.

In some embodiments, process 400 can determine that a received video content item is associated with a first language. In some embodiments, process 400 can use any suitable information to determine that a received video content item is associated with a first language. For example, process 400 can determine that a received video content item is associated with a first language based on user information, such as information contained in a cookie file, a user profile, user preferences, and/or any other suitable source of user information. In such an example, the source of user information can be associated with a web site, a web browser, a mobile device application, and/or any other suitable source of user information. As a more particular example, the source of user information can be user preferences associated with a web browser, and among the user preferences can be a language preference, such as a Spanish language preference. In such a more particular example, based on the user information, process 400 can determine that the received video content item is associated with the Spanish language.

In some embodiments, process 400 can determine that the received video content item is associated with a first language using metadata associated with the received video content item. For example, upon receiving a video content item that is associated with metadata, process 400 can determine whether the metadata contains information identifying a language of the content contained in the video content item and determine that the video content item is associated with such a language. As a more particular example, if the video content item is associated with metadata identifying that the language of the content contained in the video content item is English, process 400 can associate the video content item with an English language identifier. As another more particular example, if the video content item is associated with metadata indicating that the video content item contains subtitles that are in Italian, process 400 can associate the video content item with an Italian language identifier. Additionally or alternatively, process 400 can determine which language is more prevalent within the video content item (e.g., spoken English in the audio content and Italian text in the subtitle content) and select the appropriate language identifier. In some embodiments, process 400 can designate multiple language identifiers with the video content item (e.g., both an English language identifier and an Italian language identifier).

In some embodiments, process 400 can determine that the received video content item is associated with a first language based on the location of a user device used to upload the received video content item. For example, process 400 can determine that an Internet Protocol address ("IP address") of the user device used to upload the video content item is associated with a region in France and associate the video content item with a French language identifier based on the location associated with the IP address. As another example, process 400 can receive geographic coordinates of a user device (e.g., determined using a Global Positioning System) used to upload the video content item, determine that the geographic coordinates correspond to a location in the United States, and associate the video content item with an English language identifier based on the coordinates.

It should be noted that, prior to receiving a video content item, these mechanisms will provide a user with an opportunity to provide a consent and/or authorization to utilize user information, such as receiving geographic coordinates of a user device and utilizing user information from a cookie file, user profile, and/or user preferences. For example, upon loading an application for playing media content on a computing device, such as a mobile device, such an application can prompt the user to provide the consent and/or authorization. In a more particular example, in response to downloading the application for playing media content and loading the application on the computing device, the user can be prompted with a message that requests (or requires) that the user provide consent and/or authorization for the mechanisms to utilize user information.

At 404, process 400 can identify content in the audio and/or image data of the video content item using any technique or combination of techniques. For example, process 400 can identify words in audio data of the video content item utilizing any suitable speech recognition technique or techniques for identifying words in audio data for any suitable language or languages. In such an example, process 400 can identify one word, a plurality of words, or no words in audio data. Furthermore, in such an example, process 400 can identify words from any portion of audio data of the video content item, such as a first portion, a last portion, or all of the audio data of the video content item. As another example, process 400 can identify words in image data of the video content item utilizing any suitable text recognition technique or techniques for identifying words in image data for any suitable language or languages. As a more particular example, process 400 can utilize optical character recognition, intelligent character recognition, and/or any other suitable text recognition process.

At 406, process 400 can determine a likelihood that the video content item is a multi-lingual content item (e.g., designating the content item as language-independent or language-agnostic). In some embodiments, process 400 can determine a likelihood that the video content item is not language specific using any suitable technique or combination of techniques and/or any suitable information. For example, process 400 can determine a likelihood that the video content item is not language specific based on the presence of words identified from the video content item at 404. As a more particular example, if no words, or if very few words (e.g., less than a threshold number of words), are identified at 404, process 400 can determine that the video content item is likely not language specific and indicate that the video content item is a multi-lingual content item (e.g., using a multi-lingual identifier associated with the video content item). As another more particular example, if many words (e.g., more than a threshold number of words) are identified at 404, process 400 can determine that the video content item is likely language specific.

In some embodiments, process 400 can determine a likelihood that the video content item is not language specific based on the number of words identified at 404. For example, process 400 can determine a raw number of words in the video content item. As a more particular example, the raw number of words can be compared to a predetermined threshold number of words. In such a more particular example, if the raw number of words exceeds the predetermined threshold number of words, process 400 can determine that the video is likely language specific. As another more particular example, process 400 can determine a word density of the video content item based on the raw number of words and the duration of the video content item. In such another more particular example, process 400 can compare the word density of the video content item with a predetermined threshold word density in order to determine the likelihood that the video content item is a multi-lingual content item that is not language specific.

In some embodiments, process 400 can calculate a likelihood score indicative of a likelihood that the video content item is a multi-lingual content item (e.g., language-independent or language-agnostic). In some embodiments, process 400 can calculate a likelihood score that ranges between any suitable values. For example, the likelihood score can be any value in a range from zero to one. In some embodiments, process 400 can calculate a likelihood score such that a high likelihood score is indicative of a high likelihood that the video content item is a multi-lingual content item that is not language specific (e.g., may be enjoyed by users associated with any of many languages) and a low likelihood score is indicative of a low likelihood that the video content item is a multi-lingual content item.

In some embodiments, process 400 can determine a likelihood that the video content item is a multi-lingual content item that is not language specific based on a portion of time that the video content item contains words as identified at 404. For example, if a large portion of the video content item contains spoken words in a particular language, process 400 can determine that the video content item is likely to be language specific (e.g., may be enjoyed by users associated with a language identifier corresponding to the language spoken in the video content item). In a more particular example, if 75% of the video content item contains spoken words in a particular language, process 400 can determine that the video content item is likely language specific.

In some embodiments, process 400 can determine a likelihood that the video content item is a multi-lingual content item that is not language specific based on a density of the words identified at 404 in the video content item. For example, if process 400 identifies one hundred words at 404 and the video content item is five minutes in length, process 400 can determine that the density of the words identified at 404 is twenty words per minute. In such an example, process 400 can determine a likelihood that the video content item is a multi-lingual content item that is not language specific based on a word density of twenty words per minute.

In some embodiments, process 400 can determine a likelihood that the video content item is a multi-lingual content item that is not language specific based on a user input. For example, process 400 can present the video content item to one or more users of one or more user devices and present a query requesting that the users of the user devices indicate whether the video content item is language specific. More particularly, the query can request that the users of the user devices select or identify a specific language that should be associated with the video content item. In such an example, process 400 can determine a likelihood that the video content item is language specific based on a proportion of the users of the user devices that indicate that the video content item is language specific. As a more particular example, process 400 can present the video content item to ten users of user devices, and if nine users indicate that the video content item is language specific, process 400 can determine a high likelihood that the video content item is language specific.

In some embodiments, process 400 can determine a likelihood that the video content item is a multi-lingual content item that is not language specific based on factors related to the content identified at 404. For example, process 400 can determine a likelihood that the video content item is a multi-lingual content item that is not language specific based on the amplitude of the content identified in audio data at 404. In such an example, process 400 can associate words at a high amplitude with a high likelihood that the video content item is language specific. As another example, process 400 can determine a likelihood that the video content item is a multi-lingual content item that is not language specific based on the amplitude of the words identified in audio data at 404 relative to the amplitude of other sounds in audio data. In such an example, process 400 can determine a high likelihood that the video content item is language specific in response to determining that the amplitude of the words identified in audio data at 404 is high relative to the amplitude of other sounds in audio data. As a more particular example, if the video content item is a television sitcom, process 400 can determine that the amplitude of the words identified in the television sitcom (e.g., conversation between actors of the television sitcom) is high relative to the non-verbal audio (e.g., sound effects) in the audio data and determine that the video content item is likely language specific. As another example, process 400 can identify an audio frequency associated with the identified words. As a more particular example, process 400 can associate the presence of certain audio frequencies (e.g., musical notes) with any suitable likelihood that the video content item is language specific.

In some embodiments, process 400 can utilize audio fingerprinting and/or digital video fingerprinting to determine a likelihood that the video content item is a multi-lingual content item that is not language specific. For example, process 400 can utilize any suitable audio fingerprinting and/or digital fingerprinting technique or combination of techniques to identify the content of a video content item and determine a probability that the video content item is a multi-lingual content item that is not language specific based on the identified content. As a more particular example, process 400 can identify the content of a video content item as a particular television program and determine a likelihood that the video content item is a multi-lingual content item that is not language specific based on a predetermined likelihood that another video content item or items identified as the particular television program are also not language specific. As another more particular example, process 400 can identify the content of a video content item as a song by a particular artist and determine a likelihood that the video content item is a multi-lingual content item that is not language specific based on a predetermined likelihood that another video content item or items identified as songs by the particular artist are also not language specific.

At 408, process 400 can cause the video content item to be presented in search results and/or recommendations for users associated with languages other than the first language associated with the video content item at 402 based on the determined likelihood that the video content item is a multi-lingual content item that is not language specific. In some embodiments, process 400 can cause the video content item to be presented in search results and/or recommendations using any suitable technique or combination of techniques and/or any suitable information. For example, if process 400 determines that the video content item is likely to be a multi-lingual content item that is not language specific at 406, process 400 can cause the video content item to be presented in search results and/or recommendations to users associated with any of many different languages, and/or regardless of a language of the user associated with the search and/or recommendation request. As another example, if process 400 determines that the video content item is likely to be language specific at 406, process 400 can inhibit or prevent the video content item from being presented in search results and/or recommendations to users associated with languages other than the language associated with the video content item. As yet another example, if process 400 determines that the video content item has a moderate likelihood of being language specific, process 400 can cause the video content item to be presented in search results and/or recommendations to some users associated with any of many different languages, but not to other such users (e.g., process 400 can cause the video content item to be presented to a test group of users).

In some embodiments, process 400 can cause the video content item to be presented in search results and/or recommendations utilizing any suitable user interface. For example, process 400 can cause the video content item to be presented in user interface 100 as shown in FIG. 1. In such an example, process 400 can cause the video content item to be presented as one of selectable video content elements 104 and can further cause one or more of language icons 110 to be presented. In a more particular example, one or more of language icons 110 can represent the first language associated with the video content item at 402. In a still more particular example, if the first language associated with the video content item is English, the corresponding language icon can display "EN," as shown in FIG. 1. In another more particular example, language icons 110 can represent that the video content item is likely a multi-lingual content item that is not language specific, as determined at 406. In another still more particular example, if process 400 determined that the video content item is likely a multi-lingual content item that is not language specific at 406, the corresponding language icon can display "ALL," as shown in FIG. 1.

In some embodiments, process 400 can cause the video content item to be presented in search results and/or recommendations as any suitable representation of the video content item. For example, the video content item can be presented as an image, a selectable icon, a hyperlink, a web page menu item, an advertisement, a thumbnail image, any other suitable representation of a video content item, or any suitable combination thereof.

In some embodiments, process 400 can present the video content item for any suitable reason. For example, process 400 can present the video content item in response to a request for video content. In another example, process 400 can present the video content item as part of a series of video content item (e.g., a playlist). In yet another example, process 400 can present the video content item as a recommendation to a user (e.g., a recommendation card or a recommendation interface that presents recommended content items). In still another example, process 400 can present the video content item automatically following the presentation of another video content item. In a further example, the video content item can be presented as an advertisement.

At 410, process 400 can receive user reaction metadata for users associated with any of many languages. In some embodiments, the user reaction metadata can be any form of data or combination of data indicative of how users react to a video content item. For example, the user reaction metadata can include data indicating how often a video content item is stopped after being played for a relatively short time (a behavior that is sometimes referred to herein as a "short click"). As another example, the user reaction metadata can include data indicating how much of the video content item is played before the video content item is stopped and/or another item is selected. As yet another example, the user reaction metadata can include data indicating how often the video content item is played until its end. As still another example, in situations where the video content item is played on a web site accessed with a web browser, the user reaction metadata can include data indicating how often the web browser leaves the web site before the end of the video content item (sometimes referred to herein as "bounce rate"). As a further example, the user reaction metadata can include data indicating how often a video content item is selected and/or played when the video content item is presented in recommendations and/or search results.

In some embodiments, process 400 can receive user reaction metadata for users associated with any suitable language. For example, process 400 can receive user reaction metadata for users associated with a language other than the first language associated with the video content item at 402. As a more particular example, if the first language associated with the video content item is English, process 400 can receive user reaction metadata for users associated with any language other than English (e.g., as indicated in language preferences for the users). As another more particular example, if the first language associated with the video content item is English, process 400 can receive user reaction metadata for users associated with the French language (e.g., having a language preference for French content).

In some embodiments, process 400 can receive user reaction metadata for users associated with a language that is part of a group of languages. As a more particular example, process 400 can receive user reaction metadata for users associated with a language that is a Latin-based language (e.g., Italian, French, and/or Spanish).

In some embodiments, process 400 can select one or more languages for which user reaction metadata is to be received. For example, process 400 can select a language for which to receive user reaction metadata that is the same as a language associated with a request for a video content item. As a more particular example, in response to a user device associated with the Spanish language requesting the video content item, process 400 can select a Spanish language preference for which to receive user reaction metadata.

At 412, process 400 can update the likelihood that the video content item is a multi-lingual content item that is not language specific based on user reaction metadata using any suitable technique or combination of techniques and/or any suitable information. In some embodiments, for example, process 400 can update the determined likelihood in response to the user reaction metadata, as received at 410, indicating that users associated with languages other than the first language associated with the video content item are reacting favorably or unfavorably to the video content item. As a more particular example, process 400 can decrease the determined likelihood in response to user reaction metadata indicating that users associated with a language other than the first language associated with the video content item are reacting unfavorably to the video content item. As a still more particular example, if process 400 receives user reaction metadata at 410 indicating a relatively high bounce rate and/or a relatively large number of short clicks from users associated with languages other than the first language associated with the video content item, process 400 can decrease the likelihood that the video content item is a multi-lingual content item that is not language specific.

In some embodiments, process 400 can update the likelihood that the video content item is a multi-lingual content item that is not language specific by comparing user reaction metadata between two or more languages. For example, process 400 can compare user reaction metadata for users associated with the first language with user reaction metadata for users associated with a different language. As a more particular example, if the first language associated with the video content item at 402 is English, process 400 can compare the user reaction metadata for users associated with an English language preference to user reaction metadata for users associated with a Japanese language preference. In such an example, if the user reaction metadata for users associated with a Japanese language preference is similar to the user reaction metadata for users associated with an English language preference (e.g., the user reaction metadata indicates a similar proportion or lesser proportion of short clicks and/or bounce rate), process 400 can increase the likelihood that the video content item is a multi-lingual content item that is not language specific.

In some embodiments, process 400 can update the likelihood that the video content item is a multi-lingual content item that is not language specific by comparing user reaction metadata between one or more languages for the video content item with user reaction metadata for other video content items. For example, if the first language associated with the video content item at 402 is English, and if the user reaction metadata received at 410 is for users associated with a Japanese language preference, process 400 can compare the received user reaction metadata with user reaction metadata for one or more other video content items that are associated with a Japanese language identifier. In such an example, if the user reaction metadata for the video content item associated with an English language identifier at 402 is similar to the user reaction metadata for the one or more other video content items associated with a Japanese language identifier, process 400 can increase the likelihood that the video content item associated with English is a multi-lingual content item that is not language specific. As another example, if the first language associated with the video content item at 402 is French, and if the user reaction metadata received at 410 is for users associated with a Spanish language preference, process 400 can compare the received user reaction metadata with user reaction metadata for several other video content items associated with Spanish language identifiers. In a more particular example, if the user reaction metadata for the video content item associated with a French language identifier at 402 is not similar to the average or median user reaction metadata for the video content items associated with Spanish language identifiers, process 400 can decrease the likelihood that the video content item associated with a French language identifier is a multi-lingual content item that is not language specific.

Figure 5:
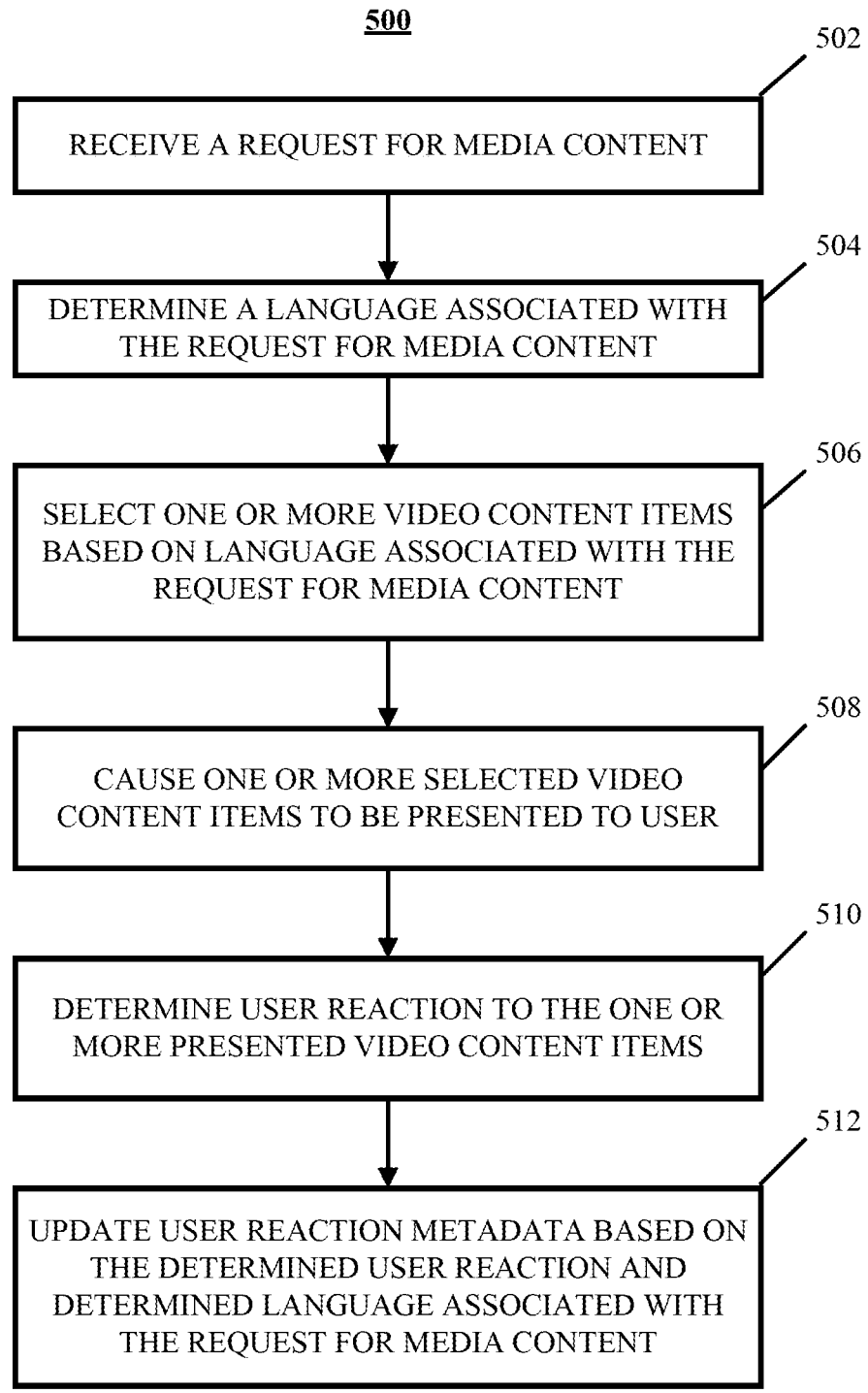
FIG. 5 shows an example of a process for presenting media content items to users associated with any of many different languages (including content items deemed to be multi-lingual content items) in accordance with some embodiments of the disclosed subject matter.

Turning to FIG. 5, an example 500 of a process for presenting media content items to users associated with any of many languages is shown in accordance with some embodiments of the disclosed subject matter.

In some embodiments, process 500 can be executed by any suitable device or combination of devices. For example, process 500 can utilize content server 202, data server 204, one or more user devices 212, and/or any other suitable device as described above in connection with FIG. 2.

Process 500 can begin at 502 by receiving a request for media content. In some embodiments, the request can be received using any suitable communication protocols, such as hypertext transfer protocol (HTTP), any suitable streaming protocol, file transfer protocol (FTP), protocols corresponding to Digital Living Network Alliance (DLNA) standards, and/or any other suitable protocol.

In some embodiments, process 500 can receive a request originating from any suitable source. For example, the received request can originate as a search query from a search engine accessed by a user device. As a more particular example, referring to FIG. 1, the received request can originate from a user entering "dance video" into search element 102 in user interface 100. As another example, the received request can originate from a web browser on a user device in response to a user selecting a video content item to view. As a more particular example referring again to FIG. 1, the received request can originate from a web browser presenting user interface 100, in response to a user selecting one of video content icons 104. As another example, the received request can originate from a computing device executing software (e.g., a web browser) that requests a video content item. As a more particular example, the received request can originate from a web browser accessing a web page with an area designated for video recommendations. As still another example, a server device hosting a web page can originate a request for one or more recommended video content items in response to a user device requesting the web page. As yet another example, the request can originate from a software application being executed by a user device that is used to receive and/or play video content items. In such an example, the software application can request a recommended video content item in response to a video content item being stopped or a video content item being played until its end.

At 504, process 500 can determine a language associated with the request for media content using any suitable technique or combination of techniques and any suitable information. For example, process 500 can determine a language associated with the request for media content based on information associated with a user using techniques described above in connection with process 400 of FIG. 4.

As another example, process 500 can determine a language associated with the request for media content based on a top-level domain accessed by a user device that caused the request for media content. As a more particular example, if the user device accesses a top-level domain associated with a particular language, process 500 can determine that the request for media content is associated with the same particular language. In such a more particular example, if the user device accesses the top-level domain ".fr," which is associated with the French language, process 500 can determine that the request for media content is also associated with the French language. Alternatively, if the user device accesses the top-level domain ".it," which is associated with the Italian language, process 500 can determine that the request for media content is also associated with the Italian language.

At 506, process 500 can select one or more video content items to be presented to the user based on a language associated with the request for media content as determined at 504. In some embodiments, process 500 can select one or more video content items that are to be presented to the user using any suitable technique or combination of techniques and any suitable information. For example, process 500 can select one or more video content items associated with a language that is the same as a language associated with the request for media content as determined at 504. As another example, process 500 can select one or more video content items associated with a language that is different from a language associated with the request for media content as determined at 504.

In some embodiments, process 500 can select one or more video content items that are to be presented on a user device based at least in part on a likelihood that one or more video content items are multi-lingual content items that are not language specific. For example, process 500 can select one or more video content items based at least in part on the likelihood that each video content item is a multi-lingual content item that is not language specific as described above in connection with process 400 at 406 of FIG. 4. In such an example, process 500 can select one or more video content items that are associated with a language different from a language associated with the request for media content if there is a relatively high likelihood that the one or more video content items are multi-lingual content items that are not language specific. As a more particular example, in a situation where process 500 determines that a request for media content is associated with French, process 500 can select a video content item that is associated with English if there is a relatively high likelihood that the video content item is a multi-lingual content item that is not language specific. As an alternative example, process 500 can select one or more video content items that are associated with the same language as a language associated with the request for media content if process 400 determines at 406 a relatively low likelihood that the one or more video content items are multi-lingual content items that are not language specific.

At 508, process 500 can cause one or more selected video content items to be presented to a user. In some embodiments, process 500 can cause one or more selected video content items to be presented to a user in any suitable format. For example, process 500 can cause one or more selected video content items to be presented to a user via a user interface, such as user interface 100 as shown in FIG. 1. In such an example, process 500 can present the one or more video content items as selectable video content elements 104. As another example, process 500 can cause a selected video content item to be presented by causing the video content item to be played back. In such an example, process 500 can cause the video content item to be played using a web browser, a web browser extension or plug-in, a mobile device application, and/or any other software application suitable for playing video content.

In some embodiments, process 500 can cause one or more selected video content items to be presented to a user of any suitable device. For example, referring back to FIG. 2, process 500 can cause one or more selected video content items to be presented to a user of any suitable user device 212.

At 510, process 500 can determine a user reaction to the one or more presented video content items. In some embodiments, process 500 can determine a user reaction to the one or more presented video content items using any suitable technique or combination of techniques, and any suitable information. For example, process 500 can determine a user reaction by determining an amount of time that each of the one or more video content items is played before the video content item is stopped. As another example, process 500 can determine a user reaction to the one or more presented video content items based on which, if any, of the one or more video content items is selected for viewing. As yet another example, process 500 can determine a user reaction to the one or more presented video content items, if the one or more video content items are being presented on a web browser, based on whether the web browser is directed to another web page before a video content item has played to its end, or before a predetermined amount of time. As still another example, process 500 can determine a user reaction to the one or more presented video content items based on whether any of the one or more presented video content items plays to its end without being stopped.

At 512, process 500 can update user reaction metadata for one or more of the presented video content items based on the determined user reaction and determined language associated with the request for media content. In some embodiments, process 500 can update user reaction metadata for the presented video content items based on the determined user reaction and determined language associated with the request for media content using any suitable technique or combination of techniques and any suitable information. For example, process 500 can update user reaction metadata for the presented video content items corresponding to a specific type of determined user reaction. As a more particular example, if process 500 determines that one of the presented video content items was played for a relatively short time before being stopped (e.g., less than a threshold proportion of the video content item), process 500 can update user reaction metadata related to the number of short clicks for the video content item. As another more particular example, if process 500 determines that one of the presented video content items was played until its end, process 500 can update user reaction metadata related to bounce rate for the video content item. As still another more particular example, if a video content item was presented as a recommendation and process 500 determines that the video content item was not selected and/or played, process 500 can update user reaction metadata that indicates how often the video content item is selected and/or played when the video content item is presented in recommendations.

In some embodiments, process 500 can update user reaction metadata that is associated with the determined language associated with the request for media content at 504. For example, if a video content item is associated with a first language (e.g., as determined by process 400 described above in connection with FIG. 4), and process 500 determines that a request for media content is associated with a second language, process 500 can update user reaction metadata that is associated only with the second language and/or user reaction metadata associated with all languages different from the first language. As a more particular example, if the video content item is associated with an English language identifier, and if process 500 receives a request for media content and determines that the request is associated with a Chinese language identifier, process 500 can update user reaction metadata that is associated with the Chinese language, and/or user reaction metadata that is associated with all languages other than the English language (e.g., user reaction metadata for all users that are not associated with an English language identifier).

In some embodiments, at least some of the above described blocks of the processes of FIGS. 4 and 5 can be executed or performed in any order or sequence not limited to the order and sequence shown in and described in connection with the figures. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

Although the embodiments disclosed herein have concerned the presentation of video content, it should be understood that the mechanisms described herein can be applied to video-only content, audio-only content, content with a combination of video and audio elements, three-dimensional content, and/or any other suitable media content.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (e.g., hard disks, floppy disks, and/or any other suitable magnetic media), optical media (e.g., compact discs, digital video discs, Blu-ray discs, and/or any other suitable optical media), semiconductor media (e.g., flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for identifying and presenting users with multi-lingual media content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting media content to users, the method comprising:
   determining whether a video content item is associated with a first language identifier, wherein the first language identifier indicates a first language associated with content within the video content item;
   determining a likelihood that the video content item is a multi-lingual content item that is not language specific based on the content within the video content item;
   modifying the first language identifier associated with the video content item to reflect that the video content item is not language specific based on the determined likelihood;
   in response to receiving a query, determining a second language identifier associated with a user account associated with the query, wherein the second language identifier is different from the first language identifier; and
   causing the video content item to be presented in response to the request query based on the modified first language identifier reflecting that the video content item is deemed to be multi-lingual content that is not language specific.

2. The method of claim 1, further comprising identifying the content in the video content segment by identifying words contained in audio content associated with the video content item.

3. The method of claim 1, further comprising identifying the content in the video content segment by identifying words contained in image content associated with the video content item.

4. The method of claim 1, further comprising, in response to the query, causing a plurality of video content items to be presented that includes the video content item and concurrently presenting a language indicator, wherein the language indicator associated with the video content item indicates that the video content item is multi-lingual content.

5. The method of claim 1, further comprising identifying content within the video content item by retrieving metadata associated with the video content item, wherein the metadata includes subtitle metadata.

6. The method of claim 1, further comprising determining the first language associated with the video content item by determining a location associated with a user device that uploaded the video content item.

7. The method of claim 1, wherein determining the likelihood that the video content item is multi-lingual content based on a number of words in the content within the video content item.

8. The method of claim 1, wherein determining the likelihood that the video content item is multi-lingual content based on a density of words in the content within the video content item.

9. The method of claim 1, wherein determining the likelihood that the video content item is multi-lingual content further comprises comparing the determined likelihood with a multi-lingual threshold score.

10. The method of claim 1, wherein determining the likelihood that the video content item is multi-lingual content further comprises determining multi-lingual content identifiers associated with content relating to the video content item.

11. The method of claim 1, further comprising:
    receiving user reaction metadata to the video content item that was deemed to be multi-lingual content; and
    updating the determined likelihood based on the received user reaction metadata.

12. The method of claim 11, wherein the user reaction metadata includes an amount of time that the video content item was presented before being stopped.

13. The method of claim 11, further comprising:
    selecting a portion of the user reaction metadata based on a language identifier associated with the user devices that provided the user reaction metadata; and
    updating the determined likelihood based on the selected portion of the user reaction metadata.

14. The method of claim 1, further comprising causing, while the video content item is being presented, a recommendation prompt that queries whether the video content item is multi-lingual content.

15. A system for presenting media content to users, the system comprising:
    a hardware processor that is configured to:
       determine whether a video content item is associated with a first language identifier, wherein the first language identifier indicates a first language associated with content within the video content item;

determine a likelihood that the video content item is a multi-lingual content item that is not language specific based on the content within the video content item;

modify the first language identifier associated with the video content item to reflect that the video content item is not language specific based on the determined likelihood;

in response to receiving a query, determine a second language identifier associated with a user account associated with the query, wherein the second language identifier is different from the first language identifier; and cause the video content item to be presented in response to the request query based on the modified first language identifier reflecting that the video content item is deemed to be multi-lingual content that is not language specific.

16. A non-transitory computer-readable medium containing computer executable instructions that, when executed by a processor, cause the processor to perform a method for presenting media content to users, the method comprising:

determining whether a video content item is associated with a first language identifier, wherein the first language identifier indicates a first language associated with content within the video content item;

determining a likelihood that the video content item is a multi-lingual content item that is not language specific based on the content within the video content item;

modifying the first language identifier associated with the video content item to reflect that the video content item is not language specific based on the determined likelihood;

in response to receiving a query, determining a second language identifier associated with a user account associated with the query, wherein the second language identifier is different from the first language identifier; and causing the video content item to be presented in response to the request query based on the modified first language identifier reflecting that the video content item is deemed to be multi-lingual content that is not language specific.

* * * * *